(12) United States Patent
Shapiro et al.

(10) Patent No.: US 8,723,836 B1
(45) Date of Patent: May 13, 2014

(54) TOUCH PANEL DEACTIVATION SYSTEMS AND METHODS

(75) Inventors: Geoffrey A. Shapiro, Cedar Rapids, IA (US); David A. Gribble, Cedar Rapids, IA (US); David L. Leedom, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 162 days.

(21) Appl. No.: 13/491,139

(22) Filed: Jun. 7, 2012

(51) Int. Cl.
*G06F 3/045* (2006.01)

(52) U.S. Cl.
USPC ........................................ 345/174

(58) Field of Classification Search
None
See application file for complete search history.

(56) References Cited

U.S. PATENT DOCUMENTS

2010/0315332 A1* 12/2010 Soh et al. ............... 345/157
2012/0274604 A1* 11/2012 Norton et al. .......... 345/174

* cited by examiner

*Primary Examiner* — Nicholas Lee
(74) *Attorney, Agent, or Firm* — Donna P. Suchy; Daniel M. Barbieri

(57) ABSTRACT

A system for disabling touch panel input capabilities may include, but is not limited to: a touch panel device including a touch panel controller; a touch panel input processing device; an isolation switching means coupling at least one of a touch panel device and the touch panel controller to the touch panel input processing device; and an electromagnetic interference (EMI) detection system configured to provide control signals to the isolation switching means.

22 Claims, 1 Drawing Sheet

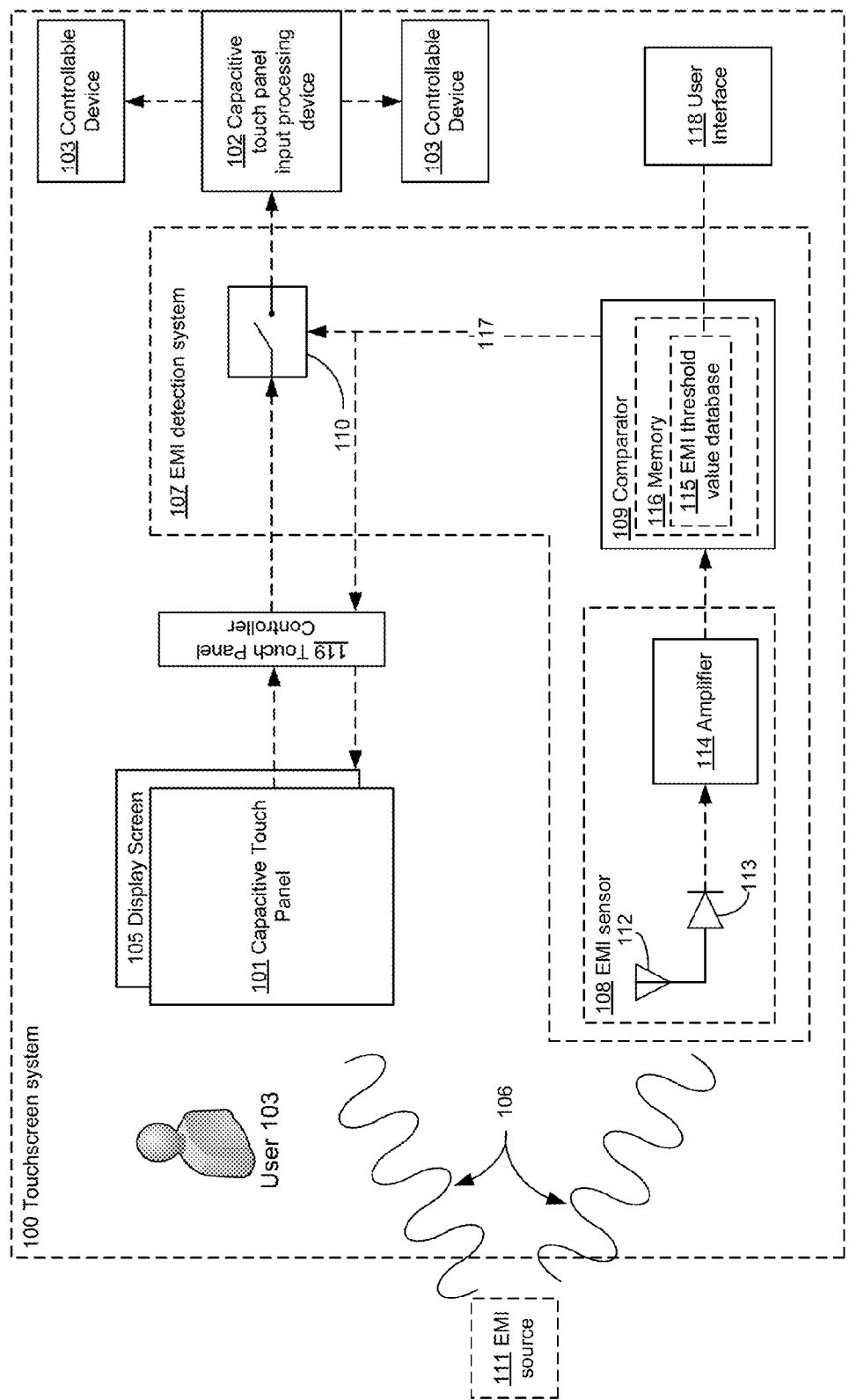

TOUCH PANEL DEACTIVATION SYSTEMS AND METHODS

BACKGROUND OF THE INVENTION

The introduction of touch panels into avionics has significantly reduced pilot workload and simplified user interfaces. Application of touch panels into the cockpit environment presents unique challenges related to both the environment and use cases. There are two common types of touch panels, resistive and capacitive. Resistive touch panels are robust but lack a few key characteristics of capacitive touch panels, namely: increased activation forces and decreased ability to support multi-touch activations. When applying a resistive touch panel in a cockpit environment, it is often necessary to add a mechanical protective cover. The addition of this cover will increase activation forces, which can cause difficult operation, especially for drag or swipe touch gestures. In addition, resistive touch panels have limited support for multi-touch operations without significantly increased complexity and cost.

Capacitive touch panels may offer reduced activation force and simpler support for multi-touch gestures. However, when applied in a cockpit environment, such capacitive touch panels may be susceptible to electromagnetic interference (EMI). EMI can originate from natural (lightning) or man-made (radio transmitter) sources. The interaction of EMI and a capacitive touch panel may cause a failure mode that can create significant safety issues. If a capacitive touch panel is exposed to certain electromagnetic fields then the touch panel can register an event with no pilot actuation. If this occurs without a pilot detecting it then the avionics under control of the capacitive touch panel could place the aircraft into an unsafe condition.

SUMMARY

The present invention is directed to systems and methods for deactivating a capacitive touch panel to prevent accidental actuation of the touch panel due to EMI. A system for disabling touch panel input capabilities may include, but is not limited to: a touch panel device including a touch panel controller; a touch panel input processing device; an isolation switching means coupling at least one of the touch panel device and the touch panel controller to the touch panel input processing device; and an electromagnetic interference (EMI) detection system configured to provide control signals to the isolation switching means.

BRIEF DESCRIPTION OF FIGURES

The numerous objects and advantages of the present invention may be better understood by those skilled in the art by reference to the accompanying figures in which:

FIG. 1 illustrates a system for touch panel input capabilities.

DETAILED DESCRIPTION

Referring to FIG. 1, a touchscreen system 100 (e.g. an avionics system) is illustrated. The touchscreen system 100 may include a capacitive touch panel 101 operably coupled to a capacitive touch panel input controller 102. The capacitive touch panel 101 may be configured to receive touch-based inputs from a user 103 to instruct the input controller 102 to transmit on or more control commands to one or more controllable devices 104. The touchscreen system 100 may further include a display screen 105 (e.g. an LCD monitor) configured to provide visual feedback to the user 103 from the controllable devices.

In a specific embodiment, the capacitive touch panel 101 may be configured to receive touch-based avionics control inputs from the user 103 to instruct the input controller 102 to transmit on or more control commands to one or more controllable avionics devices 104 (e.g. flight management systems, communications systems, flight display systems, and the like).

It may be the case that, during operation (e.g. during flight of an aircraft employing capacitive touch panel 101) the capacitive touch panel 101 may be subjected to EMI signals 106. Such EMI signals 106 may cause EMI-based interference disrupting operation of the capacitive touch panel 101. For example, the EMI signals 106 may cause interference which registers with the capacitive touch panel 101 as a touch-based input by a user. Upon such an occurrence, the capacitive touch panel 101 may provide erroneous signals to the input controller 102 indicative of a touch-based input by the user when no such touch-based input has actually occurred. Upon receipt of such a signal, the input controller 102 may transmit one or more erroneous device control signals to one or more controllable devices 104 resulting in unintended reactions from those controllable devices 104. In the case where the controllable devices 104 include flight control systems, flight display systems, flight management systems, or warning systems, such erroneous control signals resulting from EMI interference may have dangerous consequences.

As such, the touchscreen system 100 may further include an EMI detection system 107. The EMI detection system 107 may include an EMI sensor 108, a comparator 109 and an isolation switch 110 (e.g. a hardware. The EMI sensor 108 may be configured to receive EMI signals 106 from an EMI source 111. The EMI sensor 108 may be implemented as a broadband radio frequency (RF) power meter including a printed wiring board antenna 112, RF detector diode 113 and an amplifier 114. The EMI sensor 108 may receive the EMI signals 106 from the EMI source 111 and transmit those EMI signals 106 to the comparator 109. The comparator 109 may compare one or more characteristics (e.g. EMI power level, frequency, duration) of the EMI signals 106 to one or more EMI threshold values in an EMI threshold database 115 maintained in a memory element 116. The EMI threshold values may be configured such that the characteristics of potential EMI signals 106 crossing those threshold values may likely result in interference which may register with the capacitive touch panel 101 as a touch-based input by a user.

Upon a determination that the EMI signals 106 crosses the EMI threshold values maintained by the EMI threshold database 115, the comparator 109 may send a control signal 117 to the isolation switch 110 causing the isolation switch 110 to interrupt the connection between the capacitive touch panel 101 and the input controller 102. In such a manner, the EMI detection system 107 may prevent erroneous indications of a touch-based input by a user resulting from the EMI signals 106 from reaching the input controller 102 and causing unintended control operations of the controllable devices 104.

Further, the EMI detection system 107 may include a user interface 118. The user interface 118 may be any interface (e.g. a dial, switch, a touchscreen device, c.) operably coupled to the comparator 109 and configured to tune the EMI threshold values maintained by the EMI threshold database 115 to control the sensitivity of the EMI detection system 107.

Still further, the control signal 117 may also be provided to a touch panel controller 119. Upon receipt of a control signal 117 indicative of a detection of EMI signals 106 which cross an EMI threshold value, the touch panel controller 119 may provide one or more control signals 120 to the controllable devices 104 causing the controllable devices 104 to command the display screen 105 to display a notification message to the user 103 indicating the enablement status of the capacitive touch panel 101. For example, the display screen 105 may display a message indicating that touch control of the capacitive touch panel 101 has been disabled due to EMI signals 106 or that touch control of the capacitive touch panel 101 has been restored following an EMI incident. Further, the display screen 105 may display a notification of presently detected EMI levels and/or the current EMI threshold value.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which could be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed is:

1. A system for disabling touch panel input capabilities comprising:
   a touch panel device including a touch panel controller;
   a touch panel input processing device;
   an isolation switching means coupling at least one of a touch panel device and the touch panel controller to the touch panel input processing device; and
   an electromagnetic interference (EMI) detection system configured to provide control signals to the isolation switching means.

2. The system of claim 1, wherein the touch panel device is a capacitive touch panel device.

3. The system of claim 1, wherein the EMI detection system comprises:
   an EMI sensor; and
   a comparator.

4. The system of claim 3, wherein the comparator is configured to compare one or more EMI signal characteristics received by the EMI sensor to one or more threshold EMI values.

5. The system of claim 4, wherein the threshold EMI values are stored in memory.

6. The system of claim 1, further comprising:
   a video driver unit, wherein the video driver unit is configured to cause a display device to display a notification of a deactivation of touch input capabilities of the touch panel in response to EMI.

7. The method of claim 1, further comprising:
   a video driver unit, wherein the video driver unit is configured to cause a display device to display at least one of a notification of an EMI level associated with a received EMR signal and the EMI threshold value.

8. The system of claim 1, wherein the touch panel input processing device is configured for:
   receiving one or more touch-based user inputs from a touch panel device; and
   controlling one or more controllable devices according to the one or more touch-based user input devices.

9. The system of claim 8, wherein the one or more controllable devices comprise:
   one or more avionics devices.

10. A method for disabling input capabilities comprising:
    receiving an electromagnetic radiation (EMR) signal;
    comparing the EMR signal to a threshold electromagnetic interference (EMI) threshold value; and
    controlling an isolation switching means coupling a touch panel device and a touch panel input processing device according to a comparison of the EMR signal to the EMI threshold value.

11. The method of claim 10, further comprising:
    setting the EMI threshold value.

12. The method of claim 11, wherein the setting the EMI threshold value further comprising:
setting the EMI threshold value according to a user input.

13. The method of claim 10, further comprising:
displaying at least one notification of an enablement status of the touch panel device in response to the comparing the ERM signal to the threshold EMI value.

14. The method of claim 10, further comprising:
displaying at least one of a notification of an EMI level associated with a received EMR signal and the EMI threshold value.

15. The method of claim 10, further comprising:
receiving one or more touch-based user inputs from the touch panel device; and
controlling one or more controllable devices according to the one or more touch-based user input devices.

16. The method of claim 15, wherein the one or more controllable devices comprise:
one or more avionics devices.

17. A system for disabling touch panel input capabilities comprising:
means for receiving an electromagnetic radiation (EMR) signal;
means for comparing the EMR signal to a threshold electromagnetic interference (EMI) threshold value; and
means for controlling an isolation switching means coupling a touch panel device and a touch panel input processing device according to a comparison between the EMR signal to the EMI threshold value.

18. The system of claim 17, further comprising:
means for setting the EMI threshold value.

19. The system of claim 18, wherein the setting the EMI threshold value further comprising:
means for setting the EMI threshold value according to a user input.

20. The system of claim 17, further comprising:
means for displaying at least one notification of an enablement status of the touch panel device in response to the comparing the ERM signal to the threshold EMI value.

21. The system of claim 17, further comprising:
means for receiving one or more touch-based user inputs from the touch panel device; and
means for controlling one or more controllable devices according to the one or more touch-based user input devices.

22. The system of claim 21, wherein the one or more controllable devices comprise:
one or more avionics devices.

* * * * *